United States Patent
Sar et al.

(10) Patent No.: US 11,556,231 B1
(45) Date of Patent: *Jan. 17, 2023

(54) SELECTING AN ACTION MEMBER IN RESPONSE TO INPUT THAT INDICATES AN ACTION CLASS

(71) Applicant: Google LLC, Mountain View, CA (US)

(72) Inventors: Erwin Can Sar, Mountain View, CA (US); Timothy Youngjin Sohn, Mountain View, CA (US); Andrew Tomkins, Menlo Park, CA (US); Vijay Umapathy, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 17/062,248

(22) Filed: Oct. 2, 2020

Related U.S. Application Data

(63) Continuation of application No. 14/106,294, filed on Dec. 13, 2013, now Pat. No. 10,831,348.

(51) Int. Cl.
*G06F 3/048* (2013.01)
*G06F 3/0482* (2013.01)
*G06F 3/04842* (2022.01)
*G06F 16/957* (2019.01)
*G06F 3/0481* (2022.01)
*G06F 3/01* (2006.01)
*G06F 9/48* (2006.01)

(52) U.S. Cl.
CPC .......... *G06F 3/04842* (2013.01); *G06F 3/017* (2013.01); *G06F 3/048* (2013.01); *G06F 3/0481* (2013.01); *G06F 3/0482* (2013.01); *G06F 16/957* (2019.01); *G06F 9/4881* (2013.01)

(58) Field of Classification Search
None
See application file for complete search history.

(56) References Cited

U.S. PATENT DOCUMENTS

| | | |
|---|---|---|
| 5,603,054 A | 2/1997 | Theimer et al. |
| 6,842,877 B2 | 1/2005 | Robarts et al. |
| 7,027,997 B1 | 4/2006 | Robinson et al. |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Xuyang Xia
(74) *Attorney, Agent, or Firm* — Gray Ice Higdon

(57) ABSTRACT

Methods and apparatus related to determining a ranking of class members of a task component class. A task component class identifier may be identified, the task component class identifier having a plurality of associated class members. One or more task completion indicators having the identified at least one task component class identifier may be determined. Each of the task completion indicators may indicate which of the associated class members was utilized to complete a task. One or more of the associated class members for the task component class identifier may be ranked. The ranking may be based on frequency of occurrence of the given associated class member in the task completion indicators.

15 Claims, 6 Drawing Sheets

(56) References Cited

U.S. PATENT DOCUMENTS

| | | | |
|---|---|---|---|
| 7,231,229 B1 * | 6/2007 | Hawkins | H04M 1/2746 345/205 |
| 7,496,500 B2 | 2/2009 | Reed et al. | |
| 7,689,447 B1 | 3/2010 | Aboujaoude et al. | |
| 7,729,932 B2 | 6/2010 | Yokota et al. | |
| 7,822,754 B2 | 10/2010 | Bhogal et al. | |
| 7,840,434 B2 | 11/2010 | Ingman et al. | |
| 7,873,532 B2 | 1/2011 | Jones et al. | |
| 7,945,469 B2 | 5/2011 | Cohen et al. | |
| 8,055,707 B2 | 11/2011 | Desai et al. | |
| 8,108,206 B2 | 1/2012 | Hufnagel et al. | |
| 8,108,208 B2 | 1/2012 | Mäkelä | |
| 8,306,840 B2 | 11/2012 | Cohen et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 8,749,510 B2 | 6/2014 | Park et al. | |
| 8,798,585 B2 | 8/2014 | McDonough | |
| 8,972,276 B2 | 3/2015 | Storzum et al. | |
| 9,378,456 B2 | 6/2016 | White et al. | |
| 9,569,067 B2 * | 2/2017 | Jung | H04M 1/27457 |
| 9,658,738 B1 | 5/2017 | Park et al. | |
| 10,078,819 B2 | 9/2018 | Bonforte | |
| 10,187,254 B2 | 1/2019 | Li et al. | |
| 2002/0152222 A1 | 10/2002 | Holbrook | |
| 2002/0196277 A1 | 12/2002 | Bushey et al. | |
| 2006/0106774 A1 | 5/2006 | Cohen et al. | |
| 2007/0192705 A1 | 8/2007 | Lee | |
| 2007/0192750 A1 | 8/2007 | Lee et al. | |
| 2007/0254702 A1 | 11/2007 | Griffin et al. | |
| 2007/0281733 A1 | 12/2007 | Griffin et al. | |
| 2007/0290787 A1 | 12/2007 | Fiatal et al. | |
| 2008/0005700 A1 | 1/2008 | Morikawa | |
| 2008/0163112 A1 | 7/2008 | Lee et al. | |
| 2008/0256454 A1 | 10/2008 | Latzina et al. | |
| 2008/0305815 A1 | 12/2008 | McDonough | |
| 2009/0089316 A1 * | 4/2009 | Kogan | H04M 1/2748 707/999.102 |
| 2009/0113432 A1 | 4/2009 | Singh et al. | |
| 2009/0164942 A1 | 6/2009 | Laaksonen et al. | |
| 2009/0213844 A1 | 8/2009 | Hughston | |
| 2009/0219252 A1 | 9/2009 | Jarventie et al. | |
| 2009/0307212 A1 | 12/2009 | Ramot et al. | |
| 2010/0050087 A1 * | 2/2010 | Sherrard | H04M 1/72463 715/739 |
| 2010/0185474 A1 | 7/2010 | Frank | |
| 2011/0041102 A1 | 2/2011 | Kim | |
| 2011/0154259 A1 | 6/2011 | Kennedy et al. | |
| 2011/0270517 A1 | 11/2011 | Benedetti | |
| 2012/0110488 A1 | 5/2012 | Brunswig | |
| 2012/0150532 A1 | 6/2012 | Mirowski et al. | |
| 2012/0190348 A1 | 7/2012 | Yach | |
| 2012/0239761 A1 | 9/2012 | Linner et al. | |
| 2012/0242584 A1 | 9/2012 | Tuli | |
| 2012/0317499 A1 | 12/2012 | Shen | |
| 2012/0331036 A1 | 12/2012 | Duan et al. | |
| 2013/0024815 A1 * | 1/2013 | O | H04M 1/72472 715/811 |
| 2013/0073343 A1 | 3/2013 | Richardson et al. | |
| 2013/0073662 A1 | 3/2013 | Meunier et al. | |
| 2013/0097549 A1 | 4/2013 | Park | |
| 2013/0159270 A1 | 6/2013 | Urmy et al. | |
| 2013/0297551 A1 | 11/2013 | Smith et al. | |
| 2014/0033071 A1 * | 1/2014 | Gruber | G06Q 10/1097 715/752 |
| 2014/0035949 A1 | 2/2014 | Singh et al. | |
| 2014/0095466 A1 | 4/2014 | Cumby et al. | |
| 2014/0351820 A1 | 11/2014 | Lee | |
| 2014/0379750 A1 | 12/2014 | Urmy et al. | |
| 2015/0100580 A1 | 4/2015 | Mathur et al. | |
| 2015/0317066 A1 | 11/2015 | Saxena | |
| 2015/0347186 A1 | 12/2015 | Truong et al. | |
| 2017/0011303 A1 | 1/2017 | Annapureddy et al. | |
| 2019/0095633 A1 | 3/2019 | Bufferne et al. | |
| 2019/0354244 A1 | 11/2019 | Jayakumar et al. | |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87. Jan. 1, 2011.

* cited by examiner

|  | $C_1$ | $C_2$ | $C_3$ | | |
|---|---|---|---|---|---|
|  | Class of Actions | Action Class Members | Task Completion Indicators | | $R_1$ |
|  |  |  | Number | Frequency |  |
| $R_2$ | Contact | "email" | 350 | 350/1200 = 0.292 | $R_2$ |
| $R_3$ |  | "social networking" | 200 | 200/1200 = 0.167 | $R_3$ |
| $R_4$ |  | "call" | 550 | 550/1200 = 0.458 | $R_4$ |
| $R_5$ |  | "text" | 75 | 75/1200 = 0.062 | $R_5$ |
| $R_6$ |  | "video chat" | 25 | 25/1200 = 0.021 | $R_6$ |
|  |  | Total | 1200 |  |  |

FIG. 2A

|  | $C_1$ | $C_2$ | $C_3$ | | |
|---|---|---|---|---|---|
|  | Class of Entities | Entity Class Members | Task Completion Indicators | | $R_1$ |
|  |  |  | Number | Frequency |  |
|  | Grocery Store | "online stores" | 30,000 | 30,000/130,000 = 0.231 | $R_2$ |
|  |  | "delivery services" | 10,000 | 10,000/130,000 = 0.077 | $R_3$ |
|  |  | "stores near work" | 15,000 | 15,000/130,000 = 0.115 | $R_4$ |
|  |  | "neighborhood stores" | 75,000 | 75,000/130,000 = 0.577 | $R_5$ |
|  |  | Total | 130,000 |  |  |

FIG. 2B

SELECTING AN ACTION MEMBER IN RESPONSE TO INPUT THAT INDICATES AN ACTION CLASS

BACKGROUND

A user may be presented with multiple options for completing a task. For example, one or more of multiple actions may be utilized to complete a task. Also, for example, one or more of multiple entities may be interacted with to complete a task.

SUMMARY

The present disclosure is generally directed to methods and apparatus to determine a ranking of class members of a task component class. The task component class may be one of a class of actions having a plurality of potential action members, and a class of entities having a plurality of potential entity members. One or more task completion indicators associated with a task may be determined, where each of the task completion indicators indicates which of the associated class members was utilized to complete a task. The ranking of a class member for the task component class may be based on frequency of occurrence of the class member in the task completion indicators.

Some implementations are directed to ranking the potential action members for the class of actions based on one or more potential entity members. Some implementations are directed to ranking the potential entity members for the class of entities based on one or more potential action members. In some implementations a user and/or collection of users may be identified, and the ranking of the class members may be based on the user and/or collection of users. In some implementations the ranking may be utilized for the user and/or collection of users to provide suggestions to complete a task.

In some implementations a computer implemented method may be provided that includes the steps of: identifying a task component class identifier, where the task component class identifier has a plurality of associated class members, and the task component class identifier is one of, an action class identifier identifying a class of actions having a plurality of potential action members, and an entity class identifier identifying a class of entities having a plurality of potential entity members; determining one or more task completion indicators associated with the task component class identifier, where each of the task completion indicators may indicate which of the associated class members was utilized to complete a task; and ranking one or more of the associated class members for the task component class identifier, where the ranking of a given associated class member of the associated class members may be based on frequency of occurrence of the given associated class member in the task completion indicators.

This method and other implementations of technology disclosed herein may each optionally include one or more of the following features.

In some implementations the method may further include identifying a given task component class identifier, identifying an additional class member based on frequency of occurrence of the additional class member in the task completion indicators associated with the given task component class identifier, and associating the additional class member with the given task component class identifier.

In some implementations the task component class identifier may be an action class identifier, and the method may further include identifying an entity, and determining the one or more task completion indicators based on the entity. In some implementations the entity may be a class of entities.

In some implementations the task component class identifier may be an entity class identifier, and the method may further include identifying an action, and determining the one or more task completion indicators based on the action. In some implementations the action may be a class of actions.

In some implementations the method may further include identifying one or more users, and determining the one or more task completion indicators based on the one or more users. In some implementations the users may be a collection of users and where the ranking may be determined only for the collection of users. In some implementations the one or more task completion indicators may include indicators related to affirmative user-indications by the one or more users. The affirmative user-indications by the one or more users may include at least one of a check-in, payment information, telephone communication, Internet search, Internet navigation, and locational query related to the associated class members. In some implementations the method may further include utilizing the ranking for the one or more users. In some implementations the method may further include identifying user indication to complete a given task, identifying a task component class for the given task, selecting a class member of the plurality of associated class members based on the ranking, and providing the selected class member to the user to complete the given task.

The class of actions may be "contact", and the potential action members may include "email", "call", "text", "video chat", and "social networking".

The class of entities may be a collection of stores, and the individual entity members may include individual stores of the collection of stores.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may rank one or more class members for a task component class based on frequency of occurrence of the class members in task completion indicators. The determined ranking of the class members represents a new aspect of the class members.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A is a table illustrating an example class of actions, associated action members, and associated task completion indicators.

FIG. 2B is a table illustrating an example class of entities, associated entity members, and associated task completion indicators.

DETAILED DESCRIPTION

Technology described herein is useful in determining a ranking of class members of a task component class. For example, the task component class may be a class of actions such as "contact". The potential action members for the class may include "email", "call", "text", "video chat", and "social networking". Task completion indicators (e.g., check-in, payment information, telephone communication, Internet search, Internet navigation, and/or locational query) may be determined for tasks associated with the class of actions "contact". The potential action members for the class of actions may be ranked based on the frequency of occurrence of the potential action members in the task completion indicators. For example, for the class of actions "contact", the task completion indicators may indicate that "call" is a more frequently utilized potential action member to complete tasks associated with the class of actions "contact", whereas "social networking" is a less frequently utilized potential action member to complete tasks associated with the class of actions "contact". Accordingly, "call" may be associated with a higher ranking than "social networking".

As another example, the task component class may be a class of entities such as "grocery stores". The potential entity members for the class may include "online grocery stores", "store location near work", "grocery delivery service", and "neighborhood grocery store". Task completion indicators may be determined for tasks associated with the class of entities "grocery stores". The potential entity members for the class of entities may be ranked based on the frequency of occurrence of the potential entity members in the task completion indicators. For example, for the class of actions "grocery stores", the task completion indicators may indicate that "neighborhood grocery store" is a more frequently utilized potential entity member to complete the tasks associated with the class of entities "grocery stores", whereas "online grocery stores" is a less frequently utilized potential action member to complete the tasks associated with the class of entities "grocery stores". Accordingly, "neighborhood grocery store" may be associated with a higher ranking than "online grocery stores".

Figure 1:
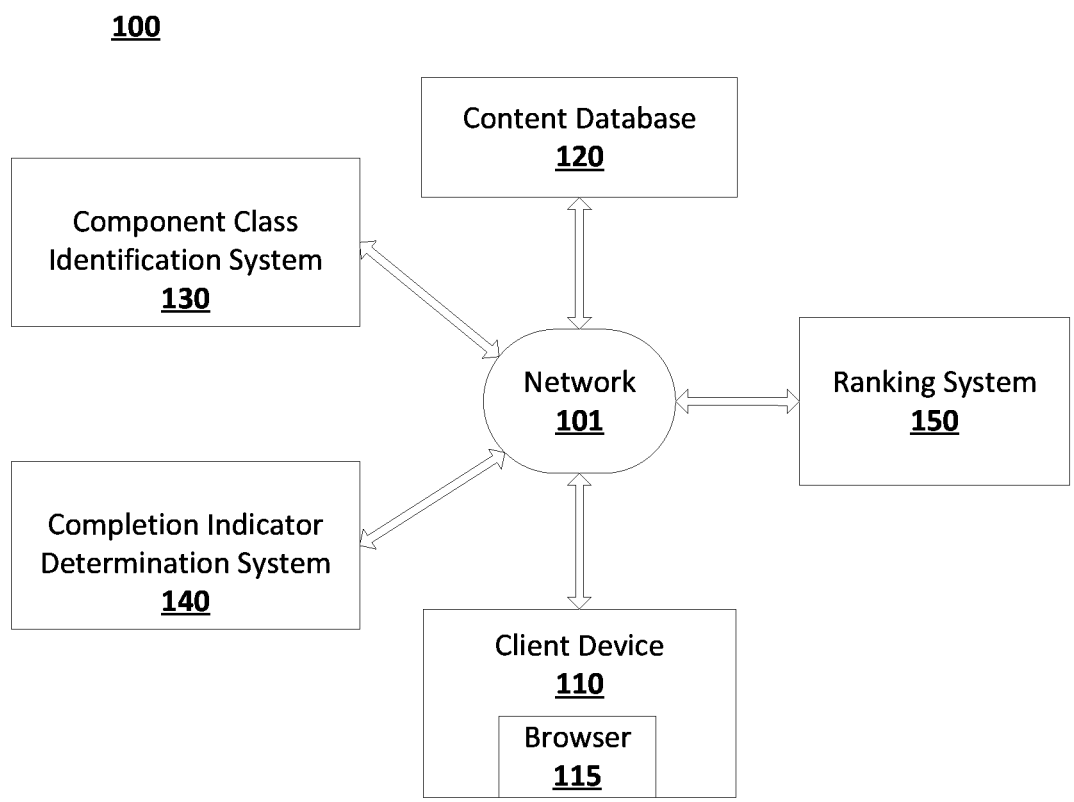
FIG. 1 is a block diagram of an example environment in which a ranking of class members of a task component class may be determined.

FIG. 1 illustrates a block diagram of an example environment 100 in which a ranking of class members of a task component class may be determined. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a content database 120, a component class identification system 130, a completion indicator determination system 140, and a ranking system 150. In some implementations the component class identification system 130 may include the ranking system 150. In some environments the component class identification system 130 and the ranking system 150 may be separate components of the environment.

The client device 110 may execute one or more applications, such as a web browser 115. The client device 110 may be, for example, a desktop computer, a laptop, a mobile phone, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided.

A task is an activity that a user seeks to perform. The task may be associated with a user and include at least a task action that is to be performed and one or more entities via which the task action is to be performed. For example, the user may seek to perform a task to purchase groceries. The task action is "purchase" and an online grocery store may be an entity via which the task action is to be performed.

The component class identification system 130 may identify a task component class identifier having a plurality of associated class members. In some implementations the task component class identifier, the plurality of associated class members, and associations between task component class identifier and class members may be stored in a database such as content database 120. For example, the task to "purchase groceries" may be associated with the task action "purchase", and with one or more entities, including brick and mortar grocery stores, online grocery stores, grocery delivery services, and so forth, via which the task action may be performed. Such associations may be stored in the content database 120, and the component class identification system 130 may identify the task component class identifier and the plurality of associated class members by accessing the content database 120. In some implementations data related to past activity of a user and/or a collection of users may be utilized to identify one or more entities that may be associated with the user and/or collection of users. For example, users associated with a particular zip code may be associated with a neighborhood grocery store as the entity via which the task action may be performed.

Class of Actions and Action Members

In some implementations the task component class identifier may be an action class identifier identifying a class of actions having a plurality of associated potential action members. For example, the action class identifier may identify a class of "contact" actions. The potential action members associated with the class of "contact" actions may include, for example, an identifier for an "email" action, an identifier for a "telephone call" action, an identifier for a "text message" action, an identifier for a "video chat" action, and/or an identifier related to a "social networking" action. Accordingly, the component class identification system 130 may identify the class of actions as "contact", and the potential action members may include "email", "telephone call", "text message", "video chat", and "social networking".

As another example, the action class identifier may identify a class of "purchase" actions. The potential action members associated with the class of "purchase" actions may include, for example, an identifier for a "physical visit" to a brick and mortar store action, an identifier for a "call" brick and mortar store action, an identifier for an "online visit" online store action, an identifier for a "delivery" action, and/or an identifier related to a "post" on social networking action. Accordingly, the component class identification system 130 may identify the class of actions as "purchase", and the potential action members may include "physical visit", "call", "online visit", "delivery", and "post". In some implementations an action member may be a class of actions. For example, the class of "contact" actions may include "write" as an action member, and "write" may be a class of actions with action members "text", "email", "post", and so forth.

Class of Entities and Entity Members

In some implementations the task component class identifier may be an entity class identifier identifying a class of entities having a plurality of potential entity members. The potential entity members may be task completion entities via which the task action may be performed. In some implementations, entities are persons, places, concepts, and/or things that may be referred to by a text fragment (e.g., a term or phrase) and are distinguishable from one another (e.g., based on context). The term "entity" as used herein will refer to a non-action entity. For example, "contact", "purchase", "visit", "send", "invite", "mail", and so forth are action entities, whereas "mobile application", "grocery store", "online store", "Business Associates", "Classmates", "Family Members", and so forth are non-action entities.

For example, the entity class identifier may identify a class of "grocery store" entities. The potential entity members associated with the class of "grocery store" entities may include, for example, an identifier for a "brick and mortar store" entity, an identifier for a "telephone number for a store" entity, an identifier for an "online store" entity, and/or an identifier for a "delivery service" entity. Accordingly, the component class identification system 130 may identify the class of entities as "grocery store", and the potential action members may include "brick and mortar store", "telephone number for a store", "online store", and "delivery service".

As another example, the entity class identifier may include identifiers for a collection of names, addresses, email addresses, telephone numbers, identifiers for social networking accounts, and so forth. In some implementations such entity class identifiers may be indexed based on associations such as business associates, family members, friends, close friends, and parents associated with a child's school. For example, the component class identification system 130 may access the content database 120 and identify the class of entities as "contacts" and the potential entity members may include "business associates", "family", "friends", "close friends", and "school parents". In some implementations an entity member may be a class of entities. For example, the class of "Grocery Store" entities may include "Online Stores" as an entity member. However, "Online Stores" may be a class of entities with entity members "Online Store A", "Online Store B", "Online Store C", and so forth.

In some implementations the content database 120 may include a database of structured data that includes nodes that represent task component class identifiers, and the plurality of associated class members. In some implementations nodes representing task component class identifiers may be connected to the associated class members. A node representing a task component class identifier may also be associated with metadata in the database of structured data (e.g., via links that represent properties of the associated class members). Any included metadata may include, for example, names/aliases for an action and/or entity, resources related to the action and/or entity, descriptive information about the action and/or entity, among other data. In some implementations the content database 120 may include entity class identifiers and associated entities. For example, for each action class identifier, a mapping (e.g., data defining an association) between the action class identifier and one or more actions related to the action class identifier may be identified in the content database 120. The class of actions and the potential action members may be identified via such a mapping. As another example, for each entity class identifier, a mapping (e.g., data defining an association) between the entity class identifier and one or more entities related to the entity class identifier may be identified in the content database 120. The class of entities and the potential entity members may be identified via such a mapping.

In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

Task Completion Indicators

The component class identification system 130 may determine one or more task completion indicators having the identified at least one task component class identifier. In some implementations the content database 120 may include data related to task component class identifiers and associated task completion indicators. The component class identification system 130 may determine the one or more task completion indicators by accessing the content database 120. Each of the task completion indicators is associated with a task having the identified at least one task component class, and indicates which of the class members of the class was utilized to complete the task. In some implementations the task completion indicators may be based on one or more affirmative user-indications by one or more users and may be indicative of user action of completing a task, and/or user interaction with a task completion entity.

For example, the task completion indicators may include indicators related to a post by the user on a social networking platform, a document visited by the user, an application used by the user, a locational query issued by the user, a location check-in by the user, an email communication to or from the user, and so forth. For example, a confirmation e-mail may be sent to the user in response to the user purchasing an item online or in a brick and mortar store. Data related to the e-mail may be a task completion indicator and may be indicative of the user action of completing a task of purchasing the item, and/or user interaction with an online task completion entity or a brick and mortar entity. Also, for example, a webpage may be visited by the user and data related to the webpage (e.g., a URL or other document identifier of the webpage, content of the webpage) may be a task completion indicator and may be indicative of the user action of visiting the webpage, and/or user interaction with the webpage. Also, for example, an application may be utilized by the user and data related to the utilization of the application may be a task completion indicator and may be indicative of the user action of utilizing the application, and/or user interaction with the application. Also, for example, a user may travel to a Business with client device 110 and data related to the location of the client device 110 may be utilized as a task completion indicator and may be indicative of the user action of traveling to the Business, and/or user interaction with the Business, and/or Business Associates associated with the Business. Additional, and/or alternative affirmative user-indications may be utilized to determine the one or more task completion indicators. For example, the affirmative user-indication may be a selection or affirmation by the user indicating that a task has been completed.

Documents include webpages, word processing documents, portable document format (PDF) documents, images, video, audio, e-mails, calendar entries, task entries, and feed sources, to name just a few. The documents may include content such as, for example: words, phrases, pictures, audio, task identifiers, entity identifiers, etc.; embedded information (such as meta information and/or hyperlinks); and/or embedded instructions (such as JavaScript scripts).

The term "check-in", as used herein, includes a user-approved and/or user-initiated indication of a visit to a location. For example, the user may utilize an application of the computing device to indicate presence at a business the user is visiting (e.g., by selection of a "check-in" option in the application while at the business, by scanning a QR code via the application at the business, by selecting the business from a list of nearby businesses). Also, for example, the user may post a comment on a social networking platform that indicates presence at a location. For example, the user may post a comment stating: "dreading the root canal" and the posted comment may be associated with location information indicting the user is at the dentist (e.g., the comment may indicate the user is "@ Dentist Office X"). As referred to herein, a "selection" of an option, a document, etc. may include, for example a mouse-click, a click-through, a voice-based selection, a selection by a user's finger on a presence-sensitive input mechanism (e.g., a touch-screen device), and/or any other appropriate selection mechanism.

In some implementations the component class identification system 130 may identify a class of actions and an entity, and the completion indicator determination system 140 may determine the one or more task completion indicators based on the identified class of actions and the entity. For example, the class of actions may be "contact", and an identified entity may be a "colleague". Accordingly, the completion indicator determination system 140 may access the content database 120 to determine one or more task completion indicators that may be associated with the class of actions "contact" and the entity "colleague". As another example, the class of actions may be "contact", and an identified entity may be a "friend". Accordingly, the completion indicator determination system 140 may access the content database 120 to determine one or more task completion indicators that may be associated with the class of actions "contact" and the entity "friend".

In some implementations the entity may be a class of entities, and the completion indicator determination system 140 may determine the one or more task completion indicators based on the identified class of actions and the class of entities. For example, the class of actions may be "contact", and a class of entities may be "business associates". Accordingly, the completion indicator determination system 140 may access the content database 120 to determine one or more task completion indicators that may be associated with the class of actions "contact" and the class of entities "business associates". As another example, the class of actions may be "contact", and the class of entities may be "family". Accordingly, the completion indicator determination system 140 may access the content database 120 to determine one or more task completion indicators that may be associated with the class of actions "contact" and the class of entities "family". Also, for example, the class of actions may be "purchase", and an identified class of entities may be "groceries". Based at least in part on the terms "purchase" and "groceries", the completion indicator determination system 140 may determine that the potential task completion entities may be a class of entities "grocery stores", and access the content database 120 to determine one or more task completion indicators that may be associated with the class of actions "purchase" and the class of entities "grocery stores".

In some implementations the component class identification system 130 may identify an action and a class of entities, and the completion indicator determination system 140 may determine the one or more task completion indicators based on the identified action and the class of entities. For example, the class of entities may be "Grocery Store", and an identified action may be "call". Accordingly, the completion indicator determination system 140 may access the content database 120 to determine one or more task completion indicators that may be associated with the class of entities "Grocery Store" and the action "call", based at least in part on the term "call".

In some implementations the action may be a class of actions, and the completion indicator determination system 140 may determine the one or more task completion indicators based on the identified class of entities and the class of actions. For example, the class of entities may be "Grocery Store", and an identified class of actions may be "purchase". Accordingly, the completion indicator determination system 140 may access the content database 120 to determine one or more task completion indicators that may be associated with the class of entities "Grocery Store" and the class of actions "purchase". As another example, the class of entities may be "Contacts", and the class of actions may be "contact". Accordingly, the completion indicator determination system 140 may access the content database 120 to determine one or more task completion indicators that may be associated with the class of entities "Contacts" and the class of actions "contact".

In some implementations task completion indicators may be based on user data from at least one of cellular tower and Wi-Fi network. For example, a task completion indicator indicative of a visit to a grocery store may be identified at least in part from cellular tower signals providing network connectivity to a user's mobile phone as the user visits the grocery store with the mobile phone. As another example, a task completion indicator indicative of a visit to a dentist's office may be identified at least in part from Wi-Fi access data from the user's mobile phone. In some implementations user data may be provided by the client device 110 at certain time intervals as a user moves with the client device 110. Such data based on past user activity may be stored in the content database 120 for future retrieval by the task component class identifier 130 and/or the completion indicator determination system 140.

In some implementations one or more users may be identified, and the one or more task completion indicators may be determined based on the one or more users. For example, the one or more users may be identified as users whose home location is in a particular postal zip code. Also, for example, the one or more users may be identified as users in one or more of a particular age group, a shared interest group (e.g., art, literature, sports, ethnic cuisine), shared backgrounds (e.g., alumni of a particular institution), shared workplace (e.g., shared company, shared office location, downtown workers), and so forth.

In some implementations any user data may not be tethered to the identity of individual users and may not be traceable to a specific user. For example, in situations in which the systems disclosed herein collect personal information about users, or may make use of personal information, the users may be provided with an opportunity to control whether programs or features collect user information (e.g., information about a user's social network, email communications, browsing history, social actions or activities, a user's preferences, or a user's current geographic location), or to control whether and/or how to receive responses to search queries and/or user-initiated actions from the task completion determination system 130 that may be more relevant to the user. Also, for example, in some implementations task completion indicators associated with an action and/or entity may only be accessible when at least a threshold number of users have contributed to the associated task completion indicators. In some implementations user data may include data that represents a summary of data related to task completion indicators from a plurality of users.

In some implementations the component class identification system 130 may identify the one or more users, and the completion indicator determination system 140 may determine the one or more task completion indicators based on a class of actions and the one or more users. For example, the class of actions may be "Contact" and the one or more users may be identified based on a postal zip code. Based at least in part on the zip code, the completion indicator determination system 140 may access the content database 120 to determine one or more task completion indicators associated with the zip code, such as check-ins, text data, telephone data, and so forth. As another example, the class of actions may be "contact", a class of entities may be "family", and the one or more users may be identified as users with ages in a first age group. Based at least in part on the age group, the completion indicator determination system 140 may access the content database 120 to determine one or more task completion indicators associated with the first age group, such video chat data, telephone data, and so forth. Also, for example, the class of actions may be "contact", a class of entities may be "family", and the one or more users may be identified as users with ages in a second age group. Based at least in part on the second age group, the completion indicator determination system 140 may access the content database 120 to determine one or more task completion indicators associated with the second age group, such text data (e.g., data related to family members), location data (e.g., data related to visits to family members), and so forth.

In some implementations the component class identification system 130 may identify the one or more users, and the completion indicator determination system 140 may determine the one or more task completion indicators based on a class of entities and the one or more users. For example, the class of entities may be "Grocery Store" and the one or more users may be identified based on a postal zip code. Based at least in part on the zip code, the completion indicator determination system 140 may access the content database 120 to determine the one or more task completion indicators associated with the zip code, such as check-ins, location data, and so forth. As another example, the class of entities may be "Grocery Store" and the one or more users may be identified as users with ages in a first age group. The completion indicator determination system 140 may access the content database 120 to determine one or more task completion indicators associated with the first age group, such as navigation data (e.g., related to online grocery stores) and telephone data (e.g., related to grocery delivery services). As another example, the class of entities may be "Contacts" and the one or more users may be identified as users in a second age group. The completion indicator determination system 140 may access the content database 120 to determine one or more task completion indicators associated with the second age group, such as telephone data and geolocation data (e.g., users in the second age group may visit their friends to contact them).

Examples of Task Component Classes and Associated Class Members

Referring to FIG. 2A, a table illustrates an example class of actions, associated action members, and associated task completion indicators. The columns are labeled $C_1$ to $C_3$, whereas the rows are labeled $R_1$ to $R_6$. Column $C_1$ lists the class of actions, Column $C_2$ lists the action members that belong to the class of actions in Column $C_1$, and Column $C_3$ lists the number and frequency data of the task completion indicators associated with the action members in Column $C_2$. The entry in Column $C_1$, Row $R_2$ is a class of actions "Contact"; Column $C_2$ lists the action members that belong to the class of actions "Contact" as "email", "social networking", "call", "text", and "video chat". Column $C_3$, Row $R_2$ indicates that 350 task completion indicators are associated with the action member "email". Column $C_3$, Row $R_3$ indicates that 200 task completion indicators are associated with the action member "social networking". Column $C_3$, Row $R_4$ indicates that 550 task completion indicators are associated with the action member "call". Column $C_3$, Row $R_5$ indicates that 75 task completion indicators are associated with the action member "text". Column $C_3$, Row $R_6$ indicates that 25 task completion indicators are associated with the action member "video chat". The total number of task completion indicators may be determined as 350+200+550+75+25=1200.

Also represented in Column $C_3$ is a frequency associated with each action member. Column $C_3$, Row $R_2$ indicates that the frequency associated with the action member "email" is 350/1200=0.292. Column $C_3$, Row $R_3$ indicates that the frequency associated with the action member "social networking" is 200/1200=0.167. Column $C_3$, Row $R_4$ indicates that the frequency associated with the action member "call" is 550/1200=0.458. Column $C_3$, Row $R_5$ indicates that that the frequency associated with the action member "text" is 75/1200=0.062. Column $C_3$, Row $R_6$ indicates that that the frequency associated with the action member "video chat" is 25/1200=0.021.

Referring to FIG. 2B, a table illustrates an example class of entities, associated entity members, and associated task completion indicators. The columns are labeled $C_1$ to $C_3$, whereas the rows are labeled $R_1$ to $R_5$. Column $C_1$ lists the class of entities, Column $C_2$ lists the entity members that belong to the class of entities in Column $C_1$, and Column $C_3$ lists the number and frequency data of the task completion indicators associated with the entity members in Column $C_2$. The entry in Column $C_1$, Row $R_2$ is a class of entities "Grocery Store"; Column $C_2$ lists the entity members that belong to the class of entities "Grocery Store" as "online stores", "delivery services", "stores near work", and "neighborhood stores". Column $C_3$, Row $R_2$ indicates that 30,000 task completion indicators are associated with the entity member "online stores". Column $C_3$, Row $R_3$ indicates that 10,000 task completion indicators are associated with the entity member "delivery services". Column $C_3$, Row $R_4$ indicates that 15,000 task completion indicators are associated with the entity member "stores near work". Column $C_3$, Row $R_5$ indicates that 75,000 task completion indicators are associated with the entity member "neighborhood stores". The total number of task completion indicators may be determined as 30,000+10,000+15,000+75,000=130,000.

Also represented in Column $C_3$ is a frequency associated with each entity member. Column $C_3$, Row $R_2$ indicates that the frequency associated with the entity member "online stores" is 30,000/130,000=0.231. Column $C_3$, Row $R_3$ indicates that the frequency associated with the entity member "delivery services" is 10,000/130,000=0.077. Column $C_3$, Row $R_4$ indicates that the frequency associated with the entity member "stores near work" is 15,000/130,000=0.115. Column $C_3$, Row $R_5$ indicates that that the frequency associated with the entity member "neighborhood stores" is 75,000/130,000=0.577.

In some implementations the completion indicator determination system 140 may determine the number and/or frequency data associated with the task completion indicators. For example, the task component class identifier 130 may identify a task component class and, based at least in part on the task completion indicators, the completion indicator determination system 140 may determine the number and/or frequency for each of the utilized class members associated with the task component class. For example, the task component class identifier 130 may identify a class of actions "Contact" and a given collection of users. The completion indicator determination system 140 may determine the number and/or frequency for each of the utilized action members such as "email", "social networking", "call", "text", and "video chat" associated with the class of actions "Contact" and the given collection of users. Based at least in part on such numbers and/or frequencies, the ranking system 150 may rank the utilized action members. For example, one or more of the action members may be ranked in the following order: "call", "video chat", and "email". In some implementations, based on the ranking, the completion indicator determination system 140 may determine that, for the given collection of users, an ambiguous action "Contact" means "call".

As another example, the task component class identifier 130 may identify a class of entities "Grocery Stores", and a collection of users in a given neighborhood. The completion indicator determination system 140 may determine the number and/or frequency for the utilized entity members such as "online stores", "delivery services", "stores near work", and "the neighborhood store" associated with the class of entities "Grocery Stores" and the collection of users in the given neighborhood. Based at least in part on such numbers and/or frequencies, the ranking system 150 may rank the utilized entity members. For example, one or more of the entity members may be ranked in the following order: "the neighborhood store", "stores near work", and "online stores". In some implementations, based on the ranking, the completion indicator determination system 140 may determine that, for the given collection of users in the given neighborhood, an ambiguous entity "Grocery Stores" means "neighborhood stores".

In some implementations the task component class identifier 130 may identify a given task component class. An additional class member may be identified based on frequency of occurrence of the additional class member in the task completion indicators associated with the given task component class, and the additional class member may be associated with the given task component class. For example, the task component class identifier 130 may identify a class of actions "Contact" and a given collection of users. Based at least in part on the task completion indicators associated with the class of actions "Contact" and the given collection of users, the completion indicator determination system 140 may identify that an additional action member such as "post" is the most frequently utilized action member. Accordingly, the completion indicator determination system 140 may associate "post" as the action member associated with the class of actions "Contact" and the given collection of users.

In some implementations a given class member may be associated with more than one task component class. For example, action members "call" and "visit" may be associated with the class of actions "contact" and the class of actions "purchase". Also, for example, entity members "Online Stores" and "brick and mortar stores" may be associated with the class of entities "Grocery Stores" and the class of entities "Electronics Stores". In some implementations the frequency for class members may be weighted based on one or more of the class members, an associated task component class, a class of actions, a class of entities, and/or a collection of users.

In some implementations the task component class identifier 130 may identify one or more class members and associate them with a task component class. Based at least in part on such identified associations, the completion indicator determination system 140 may determine the number and/or frequency for the identified one or more class members associated with the task component class. For example, the task component class identifier 130 may identify action members such as "email", "social networking", "call", "text", and "video chat". One or more of such identified action members may be associated with the class of actions "Contact" and a class of entities "Business Associates". In some implementations the completion indicator determination system 140 may determine the number and/or frequency for the identified action members for the class of actions "Contact" and the class of entities "Business Associates" based at least in part on such associations. As another example, the task component class identifier 130 may identify entity members such as "online stores", "delivery services", "stores near work", and "neighborhood stores". One or more of such identified entity members may be associated with the class of entities "Grocery Store". In some implementations the completion indicator determination system 140 may determine the number and/or frequency for the identified entity members for the class of entities "Grocery Store" based at least in part on such associations.

Ranking of the Class Members

In some implementations one or more of the associated class members for the task component class identifier may be ranked. The ranking may be based on frequency of occurrence of the given associated class member in the task completion indicators. For example, the task component class identifier may be an action class identifier, and the ranking system 150 may rank the plurality of potential action members. Also, for example, the task component class identifier may be a class of entities identifier, and the ranking system 150 may rank the plurality of potential entity members. In some implementations the content database 120 may store data related to frequency with which actions and/or entities are utilized to complete a task.

For example, the task component class may be a class of actions such as "contact"; and the completion indicator determination system 140 may access the content database 120 to retrieve frequencies of occurrence associated with the potential action members. The potential action members may be ranked based on the frequency of occurrence of the potential action members in the task completion indicators. Accordingly, for the class of actions "contact", the task completion indicators may indicate that "call" is a more frequently utilized potential action member to complete the tasks associated with the class of actions "contact", whereas "social networking" is a less frequently utilized potential action member to complete the tasks associated with the same class of actions. Accordingly, "call" will be associated with a higher ranking than "social networking".

Referring again to FIG. 2A, the completion indicator determination system 140 may access the content database 120 to retrieve frequencies of occurrence associated with the action members that belong to the class of actions "Contact". For example, as illustrated in Column $C_3$, the frequencies associated with "email", "social networking", "call", "text", and "video chat" may be respectively determined to be 0.292, 0.167, 0.458, 0.062, and 0.023. Based at least in part on the frequencies, the ranking system 150 may rank the action members in the following order: "call", "email", "social networking", "text", and "video chat". In some implementations a threshold may be identified and action members that are associated with a frequency that fails to satisfy the threshold may not be associated with the class of actions. For example, the threshold may be identified as 0.1. Accordingly, the action members "text" and "video chat" may not be associated with the class of actions "Contact" based on a determination that the frequencies 0.062 and 0.021 associated with the action members "text" and "video chat" do not satisfy the threshold of 0.1.

Also, for example, the class of actions may be "contact" and a class of entities may be "business associates". The ranking system 150 may adjust the ranking based on the class of actions "contact" and the class of entities "business associates". For example, the task completion indicators may indicate that "email" is a more frequently utilized potential action member to complete the tasks associated with the class of actions "contact" and the class of entities "business associates"; whereas "social networking" is a less frequently utilized potential action member to complete the tasks associated with the same class of actions and class of entities. As another example, the class of actions may be "contact" and a class of entities may be "family members". The ranking system 150 may adjust the ranking based on the class of actions "contact" and the class of entities "family members". For example, the task completion indicators may indicate that "call" is a more frequently utilized potential action member to complete the tasks associated with the class of actions "contact" and the class of entities "family members"; whereas "email" is a less frequently utilized potential action member to complete the tasks associated with the same class of actions and class of entities.

As another example, the task component class may be a class of entities such as "grocery stores"; and the completion indicator determination system 140 may access the content database 120 to retrieve frequencies of occurrence associated with the potential entity members in tasks associated with the class of entities. The potential entity members may be ranked based on the frequency of occurrence of the potential entity members in the task completion indicators. Accordingly, for the class of entities "grocery stores", the task completion indicators may indicate that "neighborhood grocery store" is a more frequently utilized potential entity member to complete the tasks associated with the class of entities "grocery stores", whereas "online grocery stores" is a less frequently utilized potential entity member to complete the tasks associated with the same class of entities. Accordingly, "neighborhood grocery store" will be associated with a higher ranking than "online grocery stores".

Referring again to FIG. 2B, the completion indicator determination system 140 may access the content database 120 to retrieve frequencies of occurrence associated with the entity members that belong to the class of entities "Grocery Store". For example, as illustrated in Column $C_3$, the frequencies associated with "online stores", "delivery services", "stores near work", and "neighborhood stores" may be respectively determined to be 0.231, 0.077, 0.115, and 0.577. Based at least in part on the frequencies, the ranking system 150 may rank the entity members in the following order: "neighborhood stores", "online stores", "stores near work", and "delivery services". In some implementations a threshold may be identified and entity members that are associated with a frequency that fails to satisfy the threshold may not be associated with the class of entities. For example, the threshold may be identified as 0.2. Accordingly, the entity members "stores near work" and "delivery services" may not be associated with the class of entities "Grocery Store" based on a determination that the frequencies 0.115 and 0.577 associated with the entity members "stores near work" and "delivery services" do not satisfy the threshold of 0.2.

Also, for example, the class of entities may be "brick and mortar grocery stores". The ranking system 150 may adjust the ranking based only on the class of entities. The task completion indicators may indicate that "neighborhood grocery store" is a more frequently utilized potential entity member to complete the tasks associated with the class of entities "brick and mortar grocery stores"; whereas "wholesale grocery store" is a less frequently utilized potential entity member to complete the tasks associated with the same class of entities. As another example, the class of entities may be "online stores". The ranking system 150 may adjust the ranking based only on the class of entities. For example, the task completion indicators may indicate that "manufacturers' online outlet store" is a more frequently utilized potential entity member to complete the tasks associated with the class of entities "online stores"; whereas "refurbished electronics store" is a less frequently utilized potential entity member to complete the tasks associated with the same class of entities.

As described herein, in some implementations the component class identification system 130 may identify one or more users, and the task completion determination system 140 may determine the one or more task completion indicators for the one or more users. In some implementations a collection of users of the one or more users may be identified, and the ranking may be adjusted based only on the collection of users. For example, the collection of users may be identified as users residing in a geographical area represented by a zip code, and with ages in a first age group. The ranking system 150 may associate the ranking with the collection of users. For example, for the class of actions such as "contact", the task completion indicators for the collection of users may indicate that "text" is the most frequently utilized potential action member to complete the tasks associated with the class of actions "contact" associated with the collection of users; whereas "call" is a less frequently utilized potential action member to complete the same tasks. Also, for example, the collection of users may be identified as users residing in the geographical area represented by the zip code, and with ages in a second age group. For example, for the class of actions such as "contact", the task completion indicators for the collection of users may indicate that "call" is a more frequently utilized potential action member to complete the tasks associated with the class of actions "contact"; whereas "video chat" is a less frequently utilized potential action member to complete the same tasks.

In some implementations the task component class identifier may be a class of entities identifier, and the completion indicator determination system 140 may identify a collection of users, and the ranking may be adjusted based only on the collection of users. For example, the collection of users may be identified as users residing in a geographical area represented by a zip code, and with ages in a first age group. The ranking system 150 may associate the ranking with the collection of users. For example, for the class of entities such as "grocery stores", the task completion indicators for the collection of users may indicate that "online store" is a more frequently utilized potential entity member to complete the tasks associated with the class of entities "grocery stores"; whereas "delivery services" is a less frequently utilized potential entity member to complete the same tasks. Also, for example, the collection of users may be identified as users residing in the geographical area represented by the zip code, and with ages in a second age group. The ranking system 150 may adjust the ranking based on the collection of users. For example, for the class of entities "grocery stores", the task completion indicators for the collection of users may indicate that "delivery service" is a more frequently utilized potential entity member to complete the tasks associated with the class of entities "grocery stores"; whereas "neighborhood stores" is a less frequently utilized potential entity member to complete the same tasks.

Examples of Ranking

Figure 3A:
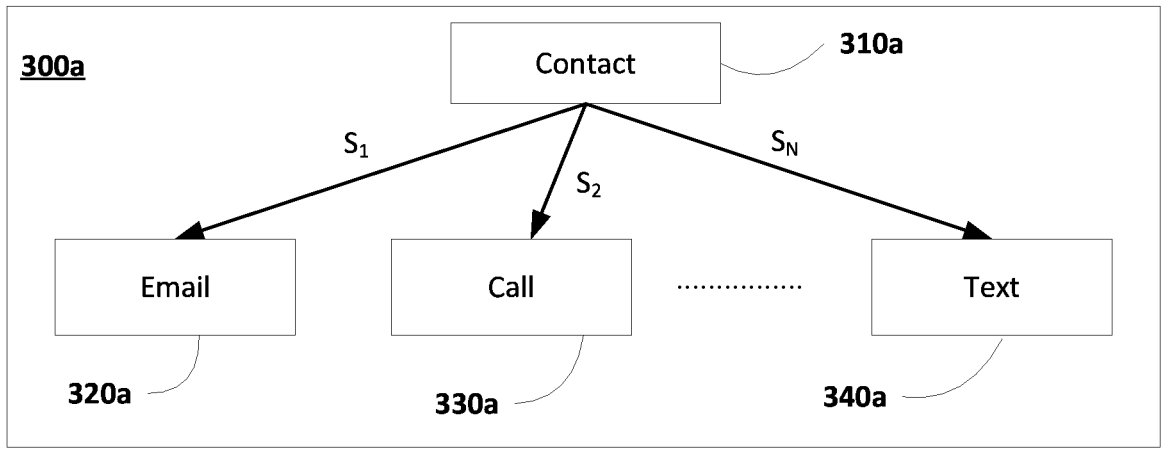
FIG. 3A is an example illustration of ranking one or more action members.

Referring to FIG. 3A, an example illustration of ranking one or more action members is provided. A class of actions "Contact" 310*a* may include action members such as "Email" 320*a*, "Call" 330*a*, and "Text" 340*a*, among others. As described herein, the action members may be ranked based on frequency of occurrence of the given associated class member in the task completion indicators. For example, the task completion indicators may indicate that "Call" 330*a* is a more frequently utilized potential action member to complete the tasks associated with the class of actions "contact", whereas "Text" 340*a* is a less frequently utilized potential action member to complete the tasks associated with the class of actions "contact". Accordingly, "Call" 330*a* may be associated with a higher ranking than "Text" 340*a*. In some implementations ranking system 150 may associate "Call" 330*a* with a score $S_2$ more indicative of frequency of occurrence, and may associate "Text" 340*a* with a score $S_N$ less indicative of frequency of occurrence.

In some implementations only action members that are associated with a ranking that satisfies a threshold may be ranked for an associated class, and/or associated with the class in a database. For example, for the class of actions "contact", the task completion indicators may indicate that "call" is a more frequently utilized potential action member to complete the tasks associated with the class of entities "family members"; whereas "email" is a less frequently utilized potential action member to complete the same tasks. Accordingly, the ranking system 150 may associate "Call" 330*a* with a score $S_2$ more indicative of frequency of occurrence, and may associate "Email" 320*a* with a score $S_1$ less indicative of frequency of occurrence. In some implementations the score $S_N$ associated with "Text" 340*a* may not satisfy a threshold. Accordingly, "Text" 340*a* may be removed as an action member associated with the class of actions "contact" and the class of entities "family members".

Figure 3B:
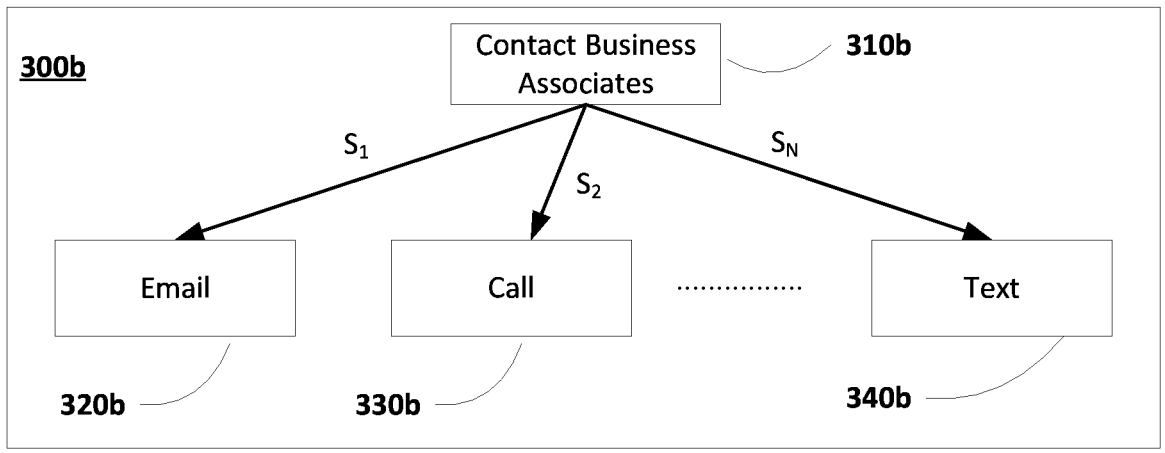
FIG. 3B is an example illustration of ranking one or more action members based on a class of actions and an entity.

Referring to FIG. 3B, an example illustration of ranking one or more action members based on a class of actions and an entity. A class of actions "Contact" 310*b* associated with a class of entities "Business Associates" may include action members such as "Email" 320*b*, "Call" 330*b*, and "Text" 340*b*, among others. The task completion indicators may indicate that "Email" 320*b* is a more frequently utilized potential action member to complete the tasks associated with the class of actions "contact", and the class of entities "Business Associates"; whereas "Call" 330*b* is a less frequently utilized potential action member to complete the same tasks. Accordingly, "Email" 320*b* may be associated with a higher ranking than "Call" 330*b*. In some implementations ranking system 150 may associate "Email" 320*b* with a score $S_1$ more indicative of frequency of occurrence, and may associate "Call" 330*b* with a score $S_2$ less indicative of frequency of occurrence. In some implementations the score $S_N$ associated with "Text" 340*b* may not satisfy a threshold. Accordingly, "Text" 340*b* may be removed as an action member associated with the class of actions "contact", and the class of entities "Business Associates".

Figure 3C:
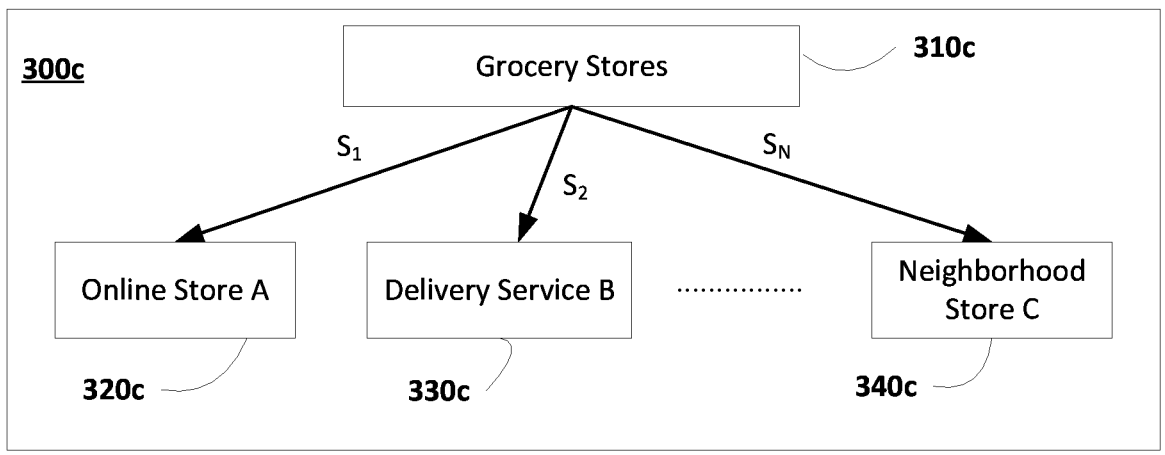
FIG. 3C is an example illustration of ranking one or more entity members based on a class of entities.

Referring to FIG. 3C, an example illustration of ranking one or more entity members based on a class of entities. A class of entities "Grocery Stores" 310*c* may include entity members such as "Online Store A" 320*c*, "Delivery Service B" 330*c*, and "Neighborhood Store C" 340*c*, among others. The task completion indicators may indicate that "Delivery Service B" 330*c* is a more frequently utilized potential entity member to complete the tasks associated with the class of entities "Grocery Stores"; whereas "Online Store A" 320*c* is a less frequently utilized potential entity member to complete the same tasks. Accordingly, "Delivery Service B" 330*c* may be associated with a higher ranking than "Online Store A" 320*c*. In some implementations ranking system 150 may associate "Delivery Service B" 330*c* with a score $S_2$ more indicative of frequency of occurrence, and may associate "Online Store A" 320*c* with a score $S_1$ less indicative of frequency of occurrence. In some implementations the score $S_N$ associated with "Neighborhood Store C" 340*c* may not satisfy a threshold. Accordingly, "Neighborhood Store C" 340*c* may be removed as an entity member associated with the class of entities "Grocery Stores".

As another example, for the class of entities "Grocery Stores", the task completion indicators may indicate that "Online Store A" is a more frequently utilized potential entity member to complete the tasks associated with the class of entities "electronics stores" and a collection of users in a first age group residing in an identified zip code; whereas "Delivery Service B" is a less frequently utilized potential entity member to complete the same tasks. Accordingly, "Delivery Service B" 330*c* may be associated with a lower ranking than "Online Store A" 320*c*. In some implementations ranking system 150 may associate "Delivery Service B" 330*c* with a score $S_2$ less indicative of frequency of occurrence, and may associate "Online Store A" 320*c* with a score $S_1$ more indicative of frequency of occurrence. Also, for example, a collection of users in a second age group residing in the identified zip code may be identified, and the ranking system 150 may adjust the ranking based only on the collection of users. For example, for the class of entities "Grocery Stores", the task completion indicators may indicate that "Online Auction Site" 340*c* is a more frequently utilized potential entity member to complete the tasks associated with the class of entities "Grocery Stores" and the collection of users in the second age group residing in the identified zip code; whereas "Delivery Service B" is a less frequently utilized potential entity member to complete the same tasks. Accordingly, "Delivery Service B" 330c may be associated with a lower ranking than "Online Auction Site" 340c. In some implementations ranking system 150 may associate "Delivery Service B" 330c with a score $S_2$ less indicative of frequency of occurrence, and may associate "Online Auction Site" 340c with a score $S_N$ less indicative of frequency of occurrence.

Utilizing the Determined Ranking

In some implementations the determined ranking for the one or more users may be utilized. For example, the task component class may be a class of actions, and the ranking may be utilized to provide suggested task completion steps to the one or more users. For example, a user may issue a search query "Contact Julie" in a user directory of contacts in a mobile device. The contact for "Julie" may be listed under "family members." As described herein, ranking system 150 may have ranked the action members based on the collection of tasks "contact family members". For example, the ranking may be "call", "video chat", and "text". Accordingly, the completion indicator determination system 140 may access the ranking from the content database 120, and provide the user with contact information in the ranked order. Julie's telephone number may be provided with a selectable option to "Call Julie", Julie's video chat identifier (e.g., telephone number, email) may be provided with a selectable option to "Video Chat with Julie", and Julie's text identifier (e.g., telephone number, email) may be provided with a selectable option to "Text Julie".

In some implementations a user indication to complete a given task may be identified. The task component class identifier 130 may identify a task component class for the given task. The completion indicator determination system 140 may access a ranking of the associated class members from the content database 120. A class member of the associated class members may be selected based on the ranking. The selected class member may be provided to the user to complete the given task. For example, user may indicate a desire to complete a task to "purchase airline tickets online". The task component class identifier 130 may identify a class of "online" entities, and access the content database to retrieve a ranking of the entity members associated with the class of "online" entities. Based on such ranking, the task component class identifier 130 may select "Online Ticket Agency A" and provide the user with an option to compete the task to "purchase airline tickets online" by utilizing the "Online Ticket Agency A".

Figure 4A:
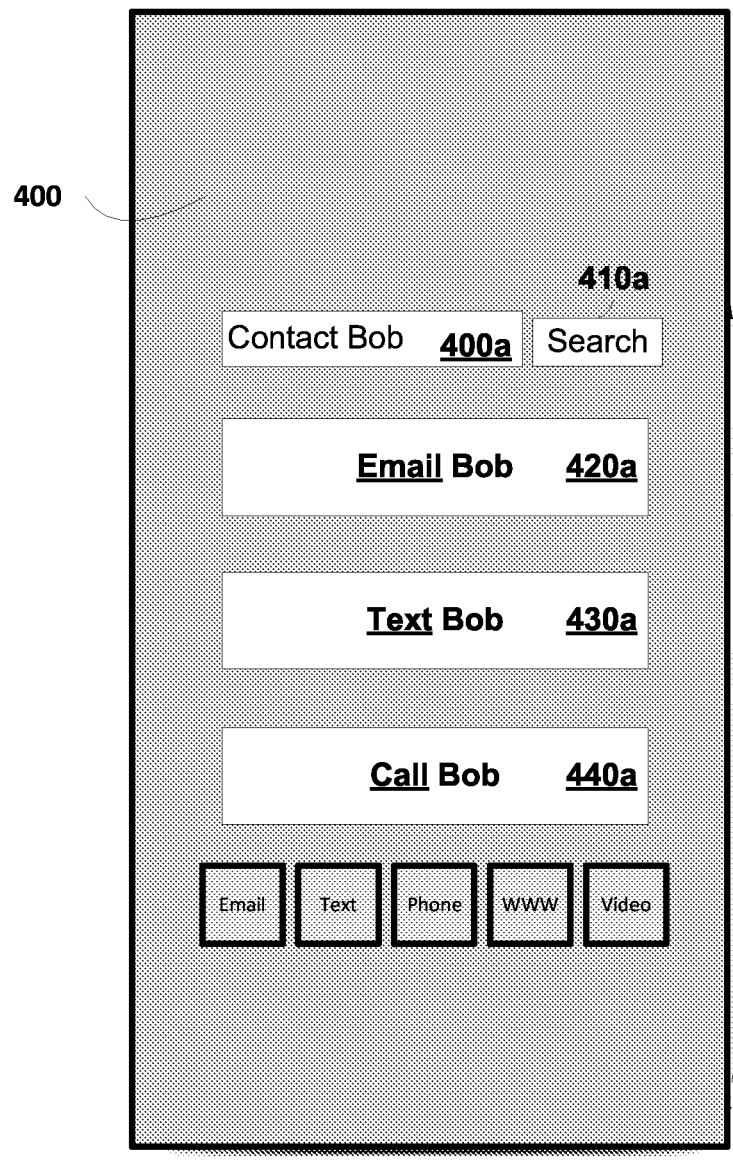
FIG. 4A is an example graphical user interface illustration of providing one or more action members to a user to complete a task based on a ranking of the one or more action members.

Referring now to FIG. 4A, an example graphical user interface illustration of providing one or more action members to a user to complete a task based on a ranking of the one or more action members. An example display on a mobile device 400 is shown. The user may input a search query "Contact Bob" into a user-editable field such as search box 400a and issue a search by selecting a search icon 410a. The contact for "Bob" may be associated with the class of "Business Associates" entities in a telephone database stored on mobile device 400. As described herein with reference to FIG. 3B, ranking system 150 may have ranked the action members based on the class of actions "contact" and the class of entities "Business Associates". For example, the ranking may be in the following order: "email", "text", and "call". The completion indicator determination system 140 may access such ranking from the content database 120 and provide the user with contact information in the ranked order. Bob's email address may be provided with a selectable option to "Email Bob" 420a; Bob's text identifier (e.g., telephone number, email) may be provided with a selectable option to "Text Bob" 430a; and Bob's telephone number may be provided with a selectable option to "Call Bob" 440a.

Figure 4B:
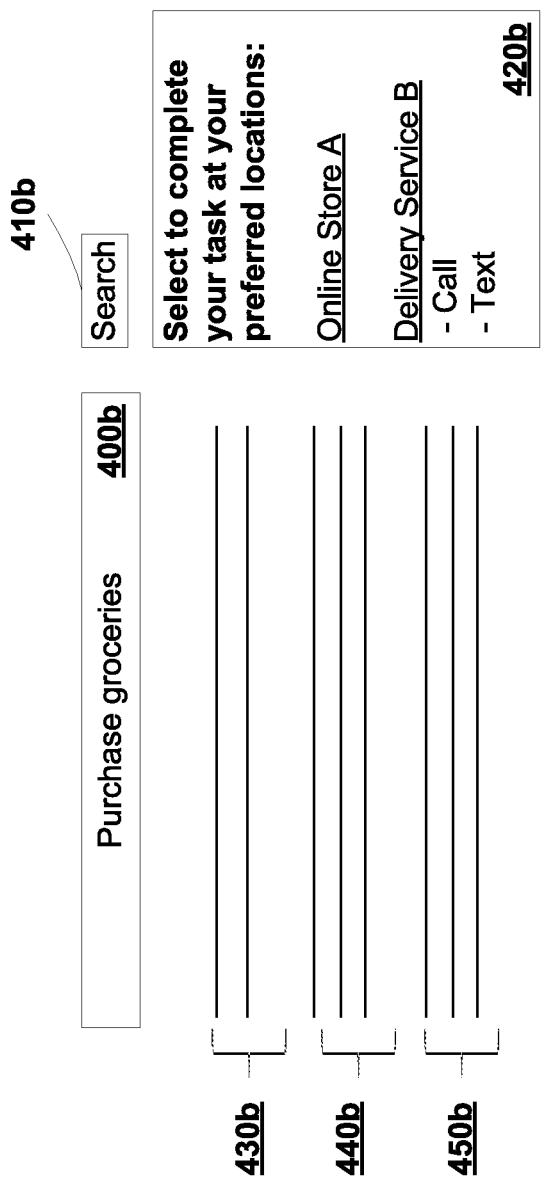
FIG. 4B is an example graphical user interface illustration of providing one or more entity members to a user to complete a task based on a ranking of the one or more entity members.

Referring now to FIG. 4B, an example graphical user interface illustration of providing one or more entity members to a user to complete a task based on a ranking of the one or more entity members. The user may input a search query "Purchase groceries" into a user-editable field such as search box 400b and issue a search by selecting a search icon 410b. The component class identification system 130 may identify a class of task completion entities "Grocery Stores" based at least in part on the terms "purchase" and "groceries" in the search query. As described herein with reference to FIG. 3C, ranking system 150 may have ranked the entity members associated with the class of entities "Grocery Stores". For example, the ranking may be "Online Store A", "Delivery Service B", and "Neighborhood Store C". Accordingly, the completion indicator determination system 140 may access such ranking from the content database 120 and provide the user with the entities in the ranked order. In some implementations the ranked entities may be displayed in a highlighted form, for example, in display box 420b. Online Store A may be provided as a first entity option with a selectable web link to the website of Online Store A. Delivery Service B may be provided as a second entity option with one or more selectable options such as a selectable option to "Call" with a link to call the telephone number associated with Delivery Service B, and a selectable option to "Text" with a link to transmit a text message to a text service associated with Delivery Service B. In some implementations the user may select the option to call Delivery Service B instead of the option to follow the link to Online Store A. Such affirmative user-actions may be utilized to adjust the rankings of the action members and/or entity members. In some implementations only entities that satisfy a threshold ranking may be provided. For example, the entity "Neighborhood Store C" may not be provided as a suggested task completion entity in response to the search query "Purchase groceries" based at least on the ranking associated with the entity "Neighborhood Store C" failing to satisfy a threshold. Additional search results responsive to the query "Purchase groceries" may be provided such as first search result 430b, second search result 440b, and third search result 450b. In some implementations the user may select one or more of the search results provided instead of the recommendations provided in display box 420b. Such affirmative user-actions may be utilized to adjust the rankings of the action members and/or entity members.

Other methods of presenting class members based on ranking are possible. For example, in some implementations one or more class members may be displayed in a different area based on the associated rankings. For example, one or more class members may be displayed in a different area and identified with a description such as "additional entities", "sponsored entities", etc. Also, for example, in some implementations the presentation of one or more class members that are based on determined rankings may be formatted differently than a presentation of one or more class members that are not based on determined rankings. For example, in some implementations a class member may be provided with an annotation, marking, and/or other visual indicator identifying the class member as being based on an associated ranking. In some implementations the determined ranking may be utilized to determine and/or rank advertisements for the user. For example, the suggestion to complete the task to "Purchase Groceries" at "Online Store A" may be presented with advertisements for "Online Store A".

While FIGS. 4A and 4B illustrate example of graphical user interfaces to provide one or more class members, presenting the one or more class members can include various forms of presentation including, for example, displaying class members on a display device, transmitting class members to a user's computer for presentation to the user, transmitting class members to another device, transmitting sounds corresponding to the ranked class members, providing haptic feedback corresponding to the class members, and/or transmitting signals comprising haptic feedback corresponding to the class members to a user's computer for presentation to the user.

In some implementations, a set of steps to perform a submitted task may be determined, where the set of steps is based on the ranking of associated class members. For example, the component class identifier system 130 may identify the task component class to be a class of actions such as "contact", including action members "call", "email", "text", and "video chat". Each action member may be associated with a set of steps to complete the task. In some implementations the set of steps may be provided to the user in response to user-initiated action indicating a desire to perform a task. In some implementations, as described herein, the action members may be provided to the user based on a ranking of the action members and the set of steps associated the respective action member may be provided therewith.

The client devices 110, the content database 120, the component class identification system 130, the completion indicator determination system 140, and the ranking system 150 may each include memory for storage of data and software applications, a processor for accessing data and executing applications, and components that facilitate communication over the communication network 101. The client devices 110 may execute applications, such as web browsers (e.g., web browser 115 executing on client device 110), that allow users to receive and place a telephone call, receive and send a text message, receive and send emails, interact with social networking sites, issue search queries, and so forth. The content database 120, the component class identification system 130, the completion indicator determination system 140, and/or the ranking system 150 may be implemented in hardware, firmware, and/or software running on hardware. For example, one or more of the systems may be implemented in one or more computer servers.

Many other configurations are possible having more or fewer components than the environment shown in FIG. 1. For example, in some environments the component class identification system 130 may include a ranking system 150. In some environments the component class identification system 130 and the ranking system 150 may be separate components.

Flow Chart Illustrating an Example Method

Figure 5:
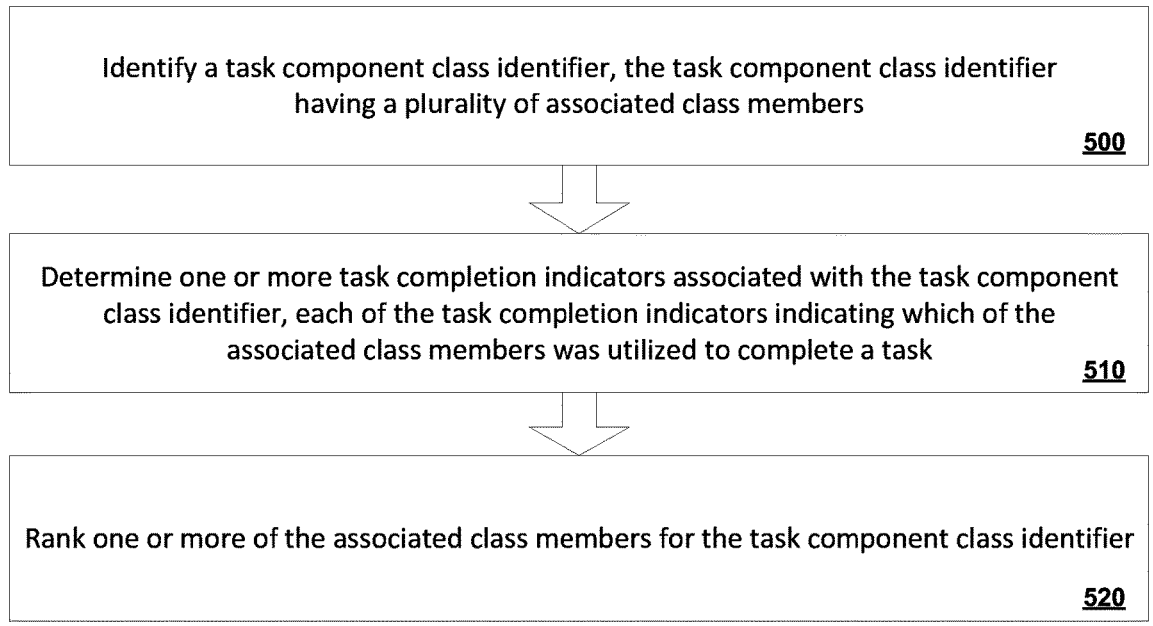
FIG. 5 is a flow chart illustrating an example method of determining a ranking of class members of a task component class.

Referring to FIG. 5, a flow chart illustrates an example method of determining a ranking of class members of a task component class. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the component class identification system 130 of FIG. 1.

At step 500, a task component class identifier may be identified. The task component class identifier may be one of an action class identifier identifying a class of actions having a plurality of potential action members, and an entity class identifier identifying a class of entities having a plurality of potential entity members.

For example, the action class identifier may identify a class of "contact" actions. The potential action members associated with the class of "contact" actions may include, for example, an identifier for an "email" action, an identifier for a "telephone call" action, an identifier for a "text message" action, an identifier for a "video chat" action, and/or an identifier related to a "social networking" action. Accordingly, the component class identification system 130 may identify the class of actions as "contact", and the potential action members may include "email", "telephone call", "text message", "video chat", and "social networking".

As another example, the entity class identifier may identify a class of "grocery store" entities. The potential entity members associated with the class of "grocery store" entities may include, for example, an identifier for a "brick and mortar store" entity, an identifier for a "telephone number for a store" entity, an identifier for an "online store" entity, and/or an identifier for a "delivery service" entity. Accordingly, the component class identification system 130 may identify the class of entities as "grocery store", and the potential action members may include "brick and mortar store", "telephone number for a store", "online store", and "delivery service".

At step 510, one or more task completion indicators having the identified at least one task component class identifier may be determined. Each of the task completion indicators may indicate which of the associated class members was utilized to complete a task. In some implementations the content database 120 may include data related to task component class identifiers and associated task completion indicators. The component class identification system 130 may determine the one or more task completion indicators by accessing the content database 120. Each of the task completion indicators is associated with a task having the identified at least one task component class, and indicates which of the class members of the class was utilized to complete the task. In some implementations the task completion indicators may be based on one or more affirmative user-indications by one or more users and may be indicative of user action of completing a task, and/or user interaction with a task completion entity.

For example, the task completion indicators may include indicators related to a post by the user on a social networking platform, a document visited by the user, an application used by the user, a locational query issued by the user, a location check-in by the user, an email communication to or from the user, and so forth. For example, a confirmation e-mail may be sent to the user in response to the user purchasing an item online or in a brick and mortar store. Data related to the e-mail may be a task completion indicator and may be indicative of the user action of completing a task of purchasing the item, and/or user interaction with an online task completion entity or a brick and mortar entity. Also, for example, a webpage may be visited by the user and data related to the webpage (e.g., a URL or other document identifier of the webpage, content of the webpage) may be a task completion indicator and may be indicative of the user action of visiting the webpage, and/or user interaction with the webpage. Also, for example, an application may be utilized by the user and data related to the utilization of the application may be a task completion indicator and may be indicative of the user action of utilizing the application, and/or user interaction with the application. Also, for example, a user may travel to a Business with client device 110 and data related to the location of the client device 110 may be utilized as a task completion indicator and may be indicative of the user action of traveling to the Business, and/or user interaction with the Business. Additional, and/or alternative affirmative user-indications may be utilized to determine the one or more task completion indicators. For example, the affirmative user-indication may be a selection or affirmation by the user indicating that a task has been completed.

At step 520, one or more of the associated class members for the task component class identifier may be ranked. The ranking may be based on frequency of occurrence of the given associated class member in the task completion indicators. For example, the task component class identifier may be an action class identifier, and the ranking system 150 may rank the plurality of potential action members. Also, for example, the task component class identifier may be an entity class identifier, and the ranking system 150 may rank the plurality of potential entity members. In some implementations the content database 120 may store data related to frequency with which actions and/or entities are utilized to complete a task.

For example, the task component class may be a class of actions such as "contact"; and the completion indicator determination system 140 may access the content database 120 to retrieve frequencies of occurrence associated with the potential action members. The potential action members may be ranked based on the frequency of occurrence of the potential action members in the task completion indicators. Accordingly, for the class of actions "contact", the task completion indicators may indicate that "call" is a more frequently utilized potential action member to complete the tasks associated with the class of actions "contact", whereas "social networking" is a less frequently utilized potential action member to complete the tasks associated with the same class of actions. Accordingly, "call" will be associated with a higher ranking than "social networking".

As another example, the task component class may be a class of entities such as "grocery stores"; and the completion indicator determination system 140 may access the content database 120 to retrieve frequencies of occurrence associated with the potential entity members in tasks associated with the class of entities. The potential entity members may be ranked based on the frequency of occurrence of the potential entity members in the task completion indicators. Accordingly, for the class of entities "grocery stores", the task completion indicators may indicate that "neighborhood grocery store" is a more frequently utilized potential entity member to complete the tasks associated with the class of entities "grocery stores", whereas "online grocery stores" is a less frequently utilized potential entity member to complete the tasks associated with the same class of entities. Accordingly, "neighborhood grocery store" will be associated with a higher ranking than "online grocery stores".

In some implementations task completion indicators may be associated with a number and/or frequency data associated with class members. In some implementations the completion indicator determination system 140 may determine the number and/or frequency data of the task completion indicators associated with the action and/or entity members. For example, the task component class identifier 130 may identify a task component class and, based at least in part on the task completion indicators, the completion indicator determination system 140 may determine the number and/or frequency for the utilized class members associated with the task component class. For example, the task component class identifier 130 may identify a class of actions "Contact" and the completion indicator determination system 140 may determine the number and/or frequency for the utilized action members such as "email", "social networking", "call", "text", and "video chat" associated with the class of actions "Contact". Based at least in part on such numbers and/or frequencies, the ranking system 150 may rank the utilized action members. For example, one or more of the action members may be ranked in the following order: "call", "video chat", and "email". In some implementations, based on the ranking, the completion indicator determination system 140 may determine that an ambiguous action "Contact" means "call".

As another example, the task component class identifier 130 may identify a class of entities "Grocery Store" and a collection of users in a given neighborhood, and the completion indicator determination system 140 may determine the number and/or frequency for the utilized entity members such as "online stores", "delivery services", "stores near work", and "the neighborhood store" associated with the class of entities "Grocery Store" and the collection of users. Based at least in part on such numbers and/or frequencies, the ranking system 150 may rank the utilized entity members. For example, one or more of the entity members may be ranked in the following order: "the neighborhood store", "stores near work", and "online stores". In some implementations, based on the ranking, the completion indicator determination system 140 may determine that an ambiguous entity "Grocery Store" means "neighborhood stores" for the users in the given neighborhood.

Example of a Computer System

Figure 6:
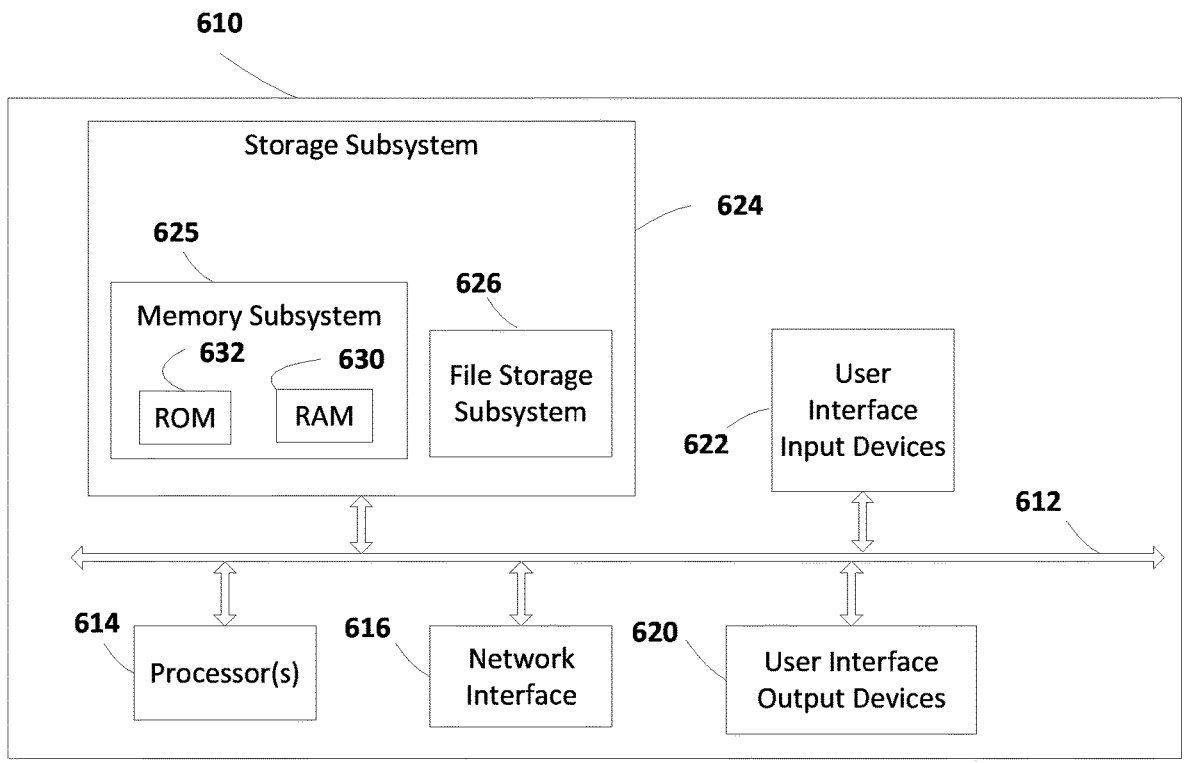
FIG. 6 illustrates a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to rank class members for a task component class. As another example, the storage subsystem 624 may include the logic to identify a task component class and class members associated with the task component class.

These software modules are generally executed by processor 614 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   identifying an action class identifier that identifies a class of actions having a plurality of action members;
   determining one or more task completion indicators associated with the action class identifier, each of the task completion indicators being based on an associated computing interaction of a user and indicating which of the action members was utilized to complete a corresponding task;
   subsequent to determining the one or more task completion indicators:
      receiving natural language user interface input generated by the user via a client device of the user;
      identifying that the action class identifier is indicated by the natural language user interface input and that a given entity is indicated by the natural language user interface input; and
      in response to the natural language user interface input indicating the action class identifier and the given entity:
         selecting a given action member, from the plurality of the action members for the action class identifier, based on at least one of the task completion indicators indicating that the given action member was utilized to complete the corresponding task; and
      in response to the natural language user interface input, and in response to selecting the given action member:
         causing the client device to present a selectable element associated with the given action member, along with an indication of the given action member, and
         responsive to selection of the selectable element, causing the client device to use the given action member to transmit a message to the given entity indicated in the natural language user interface input;
         wherein, no element associated with an additional action member, of the plurality of action members, is provided in response to the natural language user interface input.

2. The method of claim 1, further comprising:
   identifying that the given entity is indicated by the natural language user interface input;
   wherein selecting the given action member is further based on the at least one of the task completion indicators indicating that the given action member was utilized to complete the corresponding task and that the corresponding task was directed toward the given entity.

3. The method of claim 1, further comprising:
   identifying that a class of entities, of which the given entity is a member, is indicated by the natural language user interface input;
   wherein selecting the given action member is further based on the at least one of the task completion indicators indicating that the given action member was utilized to complete the corresponding task and that the corresponding task was directed toward another member of the class of entities.

4. The method of claim 1, further comprising:
   determining a quantity of the one or more task completion indicators associated with the action class identifier;
   wherein selecting the given action member based on the at least one of the task completion indicators indicating that the given action member was utilized to complete the corresponding task comprises selecting the given action member based on the quantity.

5. The method of claim 1, further comprising:
determining a frequency of the one or more task completion indicators associated with the action class identifier;
wherein selecting the given action member based on the at least one of the task completion indicators indicating that the given action member was utilized to complete the corresponding task comprises selecting the given action member based on the frequency.

6. The method of claim 1, further comprising:
determining a quantity and a frequency of the one or more task completion indicators associated with the action class identifier;
wherein selecting the given action member based on the at least one of the task completion indicators indicating that the given action member was utilized to complete the corresponding task comprises selecting the given action member based on the quantity and based on the frequency.

7. The method of claim 1, wherein the selection of the selectable element is a voice-based selection.

8. A system, comprising:
memory storing instructions;
one or more processors executing the instructions to cause the one or more processors to:
identify an action class identifier that identifies a class of actions having a plurality of action members;
determine task completion indicators associated with the action class identifier, each of the task completion indicators being based on an associated computing interaction and indicating which of the action members was utilized to complete a corresponding task;
subsequent to determining the task completion indicators:
receiving natural language user interface input generated by a user via a client device of the user;
identifying that the action class identifier is indicated by the natural language user interface input and that a given entity is indicated by the natural language user interface input; and
in response to the natural language user interface input indicating the action class identifier and the given entity:
selecting a given action member, from the plurality of the action members for the action class identifier, based on the task completion indicators indicating that the given action member was utilized to complete the corresponding task; and
in response to the natural language user interface input, and in response to selecting the given action member:
causing the client device to present a selectable element associated with the given action member, along with an indication of the given action member, and
responsive to selection of the selectable element, causing the client device to use the given action member to transmit a message to the given entity indicated in the natural language user interface input;
wherein, no element associated with an additional action member, of the plurality of action members, is provided in response to the natural language user interface input.

9. The system of claim 8, wherein in executing the instructions one or more of the processors are further to:
identify that the given entity is indicated by the natural language user interface input;
wherein in selecting the given action member one or more of the processors are further to select the entity based on the task completion indicators indicating that the given action member was utilized to complete the corresponding tasks and that the corresponding task was directed toward the given entity.

10. The system of claim 8, wherein in executing the instructions one or more of the processors are further to:
identify that a class of entities, of which the given entity is a member, is indicated by the natural language user interface input;
wherein in selecting the given action member one or more of the processors are further to select the based on the at least one of the task completion indicators indicating that the given action member was utilized to complete the corresponding tasks and that the corresponding task was directed toward another member of the class of entities.

11. The system of claim 8, wherein in executing the instructions one or more of the processors are further to:
determine a quantity of the one or more task completion indicators associated with the action class identifier;
wherein in selecting the given action member based on the task completion indicators indicating that the given action member was utilized to complete the corresponding tasks, one or more of the processors are further to select the given action member based on the quantity.

12. The system of claim 8, wherein in executing the instructions one or more of the processors are further to:
determine a frequency of the one or more task completion indicators associated with the action class identifier;
wherein in selecting the given action member based on the task completion indicators indicating that the given action member was utilized to complete the corresponding tasks, one or more of the processors are further to select the given action member based on the frequency.

13. The system of claim 8, wherein in executing the instructions one or more of the processors are further to:
determine a frequency and a quantity of the one or more task completion indicators associated with the action class identifier;
wherein in selecting the given action member based on the task completion indicators indicating that the given action member was utilized to complete the corresponding tasks, one or more of the processors are further to select the given action member based on the frequency and the quantity.

14. The system of claim 8, wherein the selection of the selectable element is a voice-based selection.

15. A non-transitory computer readable storage medium storing computer instructions executable by a processor to cause performance of a method comprising:
identifying an action class identifier that identifies a class of actions having a plurality of action members;
determining one or more task completion indicators associated with the action class identifier, each of the task completion indicators being based on an associated computing interaction of a user and indicating which of the action members was utilized to complete a corresponding task;

subsequent to determining the one or more task completion indicators:
  receiving natural language user interface input generated by the user via a client device of the user;
  identifying that the action class identifier is indicated by the natural language user interface input and that a given entity is indicated by the natural language user interface input; and
  in response to the natural language user interface input indicating the action class identifier and the given entity:
    selecting a given action member, from the plurality of the action members for the action class identifier, based on at least one of the task completion indicators indicating that the given action member was utilized to complete the corresponding task; and
    in response to the natural language user interface input, and in response to selecting the given action member:
      causing the client device to present a selectable element associated with the given action member, along with an indication of the given action member, and
      responsive to selection of the selectable element, causing the client device to use the given action member to transmit a message to the given entity indicated in the natural language user interface input;
    wherein, no element associated with an additional action member, of the plurality of action members, is provided in response to the natural language user interface input.

* * * * *